United States Patent Office 2,698,247
Patented Dec. 28, 1954

2,698,247

STABILIZATION OF ORGANIC COMPOUNDS

Ralph B. Thompson, Hinsdale, Ill., assignor to Universal Oil Products Company, Chicago, Ill., a corporation of Delaware No Drawing. Application March 10, 1949,
Serial No. 80,776

6 Claims. (Cl. 99—163)

This invention relates to the stabilization of organic compounds which tend to deteriorate in storage or in use due to oxidation reactions.

Various organic compounds are unstable in storage or during treatment and form undesirable gums, undergo discoloration, form sludges or otherwise deteriorate due to oxidation, polymerization or other undesired reactions. Included among the organic compounds which undergo such deterioration are gasoline, diesel oil, mineral oil, transformer oil, lubricating oil, fuel oil, drying oil, greases, edible fats and oils, acetylenes and particularly vinyl acetylene, butadiene, isoprene, styrene and other vinyl aromatics, various unsaturated alcohols, acids, ketones, etc.

The invention is particularly applicable to the stabilization of unsaturated gasolines and still more particularly cracked and polymer gasolines. In storage or during treatment these unsaturated gasolines tend to form undesirable gums. The invention is also applicable to the treatment of aviation gasolines which tend to undergo deterioration due to the addition of tetraethyl lead fluid or due to other components in the gasoline.

The invention is also particularly applicable to the stabilization of edible fats and oils which generally are of animal or vegetable origin and which tend to become rancid, especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc. It is understood that other oils and fats may be treated within the scope of the present invention, including oils and fats which have previously been subjected to various treatments, such as blowing with air, heat treatment, hydrogenation, etc.

In another embodiment the present invention is particularly applicable to the treatment of crops by dusting or spraying in order to preserve food accessory factors such as carotene, vitamins, various fatty acids, alcohols, etc.

In one embodiment the present invention relates to a method of stabilizing an organic material subject to oxidative deterioration which comprises adding thereto an inhibitor comprising a dialkdihydroxynaphthalene.

In a specific embodiment the present invention relates to stabilizing motor fuel normally tending to deteriorate in storage which comprises adding thereto from about 0.001% to about 0.5% by weight of 2,6-di-isobutenyl-1,5-dihydroxynaphthalene.

In another specific embodiment the present invention relates to a method of stabilizing edible fats and oils normally subject to oxidative deterioration which comprises adding thereto from about 0.001% to about 0.5% by weight of 2,6-di-isobutyl-1,5-dihydroxynaphthalene.

In another specific embodiment the present invention relates to an organic material subject to oxidative deterioration containing, as an inhibitor for such deterioration, a dialkdihydroxynaphthalene.

While dihydroxynaphthalenes are satisfactory inhibitors for certain organic materials which undergo oxidative deterioration, the dihydroxynaphthalenes are not as soluble in the organic materials as is desirable. The present invention provides a novel method of converting dihydroxynaphthalenes into potent inhibitors which are of increased solubility in organic materials and. therefore, may satisfactorily be employed for preventing or retarding oxidative deterioration thereof.

As used in the present specification and claims the nomenclature "dialkdihydroxynaphthalene" is defined to mean a dihydroxynaphthalene containing two substituent groups comprising aliphatic radicals having not more than one double bond in each radical. Thus, the dialk substituent may be selected from the group consisting of dialkyl and dialkenyl radicals.

The novel inhibitors of the present invention may be prepared in any suitable manner. In a preferred method of preparation, a dihydroxynaphthalene is reacted with an allylic halide to form a diallyl ether. The diallyl ether is rearranged to form the dialkenyl dihydroxynaphthalene. In one embodiment of the invention the dialkenyl dihydroxynaphthalene comprises the inhibitor. In another embodiment of the invention the dialkenyl dihydroxynaphthalene is hydrogenated to form the corresponding dialkyl dihydroxynaphthalene which comprises the inhibitor.

The dihydroxynaphthalene preferably comprises 1,5-dihydroxynaphthalene, although it is understood that other suitable dihydroxynaphthalenes are comprised within the scope of the present invention. Thus, suitable but not necessarily equivalent dihydroxynaphthalenes include 1,3-dihydroxynaphthalene, 1,4-dihydroxynaphthalene, 1,6-dihydroxynaphthalene, 1,7-dihydroxynaphthalene, 1,8-dihydroxynaphthalene, 2,6-dihydroxynaphthalene and 2,7-dihydroxynaphthalene.

The dihydroxynaphthalene is reacted with a suitable allyl halide to form the corresponding diallyl ether. Any suitable allyl halide may be embodied including allyl halide, methallylhalide, dimethallyl halide, ethallyl halide, diethallyl halide, propallyl halide, etc. Of the halides, the chlorides and bromides are preferred because of their ready availability and lower cost. However, it is understood, that the iodides and fluorides may be used but not with necessarily equivalent results.

The reaction of dihydroxynaphthalene with allyl halide is readily effected in the presence of a basic reagent such as sodium hydroxide, potassium hydroxide, etc. Usually the reaction is effected in the presence of a solvent, a particularly satisfactory solvent comprising a mixture of an alcohol, and particularly methanol, and water. It is understood that any other suitable solvent may be employed. A particularly suitable method for effecting this reaction, which is relatively simple and produces satisfactory results, is to heat and reflux the dihydroxynaphthalene and allyl halide in the presence of the basic reagent and solvent while stirring vigorously. The temperature of heating and refluxing will depend upon the particular halide employed and generally will be at the boiling point temperature of the halide under the particular pressure employed. The time of refluxing should be sufficient to complete the reaction and will vary with the particular halide, dihydroxynaphthalene and type of refluxing apparatus employed. It is preferably to effect this reaction in an inert atmosphere such as nitrogen in order to minimize undesired color formation and side reactions.

After the reaction has been completed to the desired extent, the products are cooled, and water and sufficient alkaline reagent, such as caustic solution, is added to make the product alkaline. The product may be extracted with a suitable solvent such as ether, etc. to remove the alkaline insoluble material comprising the desired diether.

The diether formed in the manner hereinbefore set forth or by any other suitable method may be rearranged to the dialkenyl dihydroxynaphthalene by heating to boiling temperature. The rearrangement reaction is exothermic and in some cases it may be necessary to employ means to control the exothermic heat of reaction. This may be accomplished by the use of external cooling means or by effecting the heating in the presence of a high boiling material which will not adversely affect the reaction. Suitable high boiling materials include such organic compounds as diethylaniline or coal tar base fractions boiling of the order of 220–240° C. After the reaction has proceeded to the desired extent, the products are recovered in any suitable manner and are separated from the high boiling material when used. A particularly suitable method of recovering the dialkenyl dihydroxynaphthalene is by extracting with dilute caustic solution and subsequently acidifying with a dilute acid.

The dialkenyl dihydroxynaphthalene formed in the manner hereinbefore set forth or in any other suitable manner comprises in one embodiment of the invention the inhibitor for use in stabilizing organic materials subject to oxidative deterioration. In another embodiment of the invention the dialkenyl dihydroxynaphthalene may be hydrogenated in any suitable manner to form the corresponding dialkyl dihydroxynaphthalene which, in another embodiment of the invention, comprises the inhibitor. A particularly suitable method for effecting the hydrogenation includes the use of a nickel catalyst and temperatures within the range of from about 50° to about 150° F. However, it is understood that any other suitable hydrogenating catalyst may be employed within the scope of the present invention.

Preferred inhibitors of the present invention comprise 2,6-diisobutenyl-1,5-dihydroxynaphthalene and 2,6-diisobutyl-1,5-dihydroxynaphthalene. Other satisfactory but not necessarily equivalent inhibitors of the present invention include 2,3-diisobutenyl-1,4-dihydroxynaphthalene, 2,3-diisobutyl-1,4-dihydroxynaphthalene, 2,5-diisobutenyl-1,6-dihydroxynaphthalene, 2,5-diisobutyl-1,6-dihydroxynaphthalene, 2,8-diisobutenyl-1,7-dihydroxynaphthalene, 2,8-diisobutyl-1,7-dihydroxynaphthalene, etc. Diisobutenyl-dihydroxynaphthalene and after hydrogenation diisobutyl-dihydroxynaphthalene are formed by reacting methallyl chloride with dihydroxynaphthalene. When the dipropenyl or dipropyl substituted compounds are desired, allyl halide will be used for reacting with the dihydroxynaphthalene. Similarly, when 5-membered substituents are desired, dimethallyl halides will be used. It is understood that other suitable allyl halides may be used within the scope of the present invention.

The inhibitor of the present invention is generally added to organic materials in an amount of less than 1% by weight and preferably within the range of from about 0.001% to about 0.5%. When used in gasoline, it is understood that the inhibitor may be used in conjunction with various dyes, synergists, metal deactivators, antiknock agents such as tetraethyl lead, etc. When used in edible fats and oils, it is understood that the inhibitor may be used in conjunction with a synergist, such as phosphoric acid, ascorbic acid, etc.

The following examples are introduced to further illustrate the novelty and utility of the present invention but not with the intention of unduly limiting the same.

2,6-diisobutenyl-1,5-dihydroxynaphthalene was prepared as follows: 160 grams of 1,5-dihydroxynaphthalene was added to 250 cc. of methanol, 250 cc. of water and 60 grams of sodium hydroxide. 182 grams (2 mols) of methallyl chloride was gradually added, and the mixture was vigorously stirred. The mixture was boiled under reflux conditions for two hours. The mixture was allowed to cool and a liter of water, along with sufficient sodium hydroxide to form an alkaline product, were added. The product was extracted with ether-petroleum ether solvent to recover the alkali insoluble material comprising the desired diallyl diether of 1,5-dihydroxynaphthalene. The diether was boiled for ½ hour in diethylaniline to rearrange the diether to 2,6-diisobutenyl-1,5-dihydroxynaphthalene. The desired product was recovered by extraction with 10% caustic solution and thereafter acidified with dilute sulfuric acid.

2,6-diisobutyl-1,5-dihydroxynaphthalene was prepared by hydrogenating a portion of the 2,6-diisobutenyl-1,5-hydroxynaphthalene formed in the above manner. The hydrogenation was effected in the presence of a nickel catalyst at room temperature.

Example I 0.05% by weight of 2,6-diisobutenyl-1,5-dihydroxynaphthalene, prepared in the above manner, was added to a Pennsylvania cracked gasoline having a blank induction period of 100 minutes and increased the induction period thereof to 515 minutes. The 2,6-diisobutenyl-1,5-dihydroxynaphthalene was readily soluble in the gasoline.

Example II 2,6-diisobutyl-1,5-dihydroxynaphthalene was added in an amount of 0.05% by weight to another sample of the same Pennsylvania cracked gasoline and served to increase the induction period thereof from 100 minutes to 740 minutes. The 2,6-diisobutyl-1,5-dihydroxynaphthalene was readily soluble in gasoline.

Example III 0.02% by weight of 2,6-diisobutyl-1,5-dihydroxynaphthalene was added to a lard having a normal stability period of 2½ hours and served to increase the stability period thereof to approximately 56 hours. The 2,6-diisobutyl-1,5-dihydroxynaphthalene was readily soluble in the lard.

I claim as my invention:

1. A method of stabilizing an organic material subject to oxidative deterioration which comprises adding thereto an inhibitor comprising 2,6-diisobutenyl-1,5-dihydroxynaphthalene.

2. Organic material subject to oxidative deterioration containing, as an inhibitor for said deterioration, 2,6-diisobutenyl-1,5-dihydroxynaphthalene.

3. A method of stabilizing motor fuel subject to oxidative deterioration which comprises adding thereto from about 0.001% to about 0.5% by weight of 2,6-diisobutenyl-1,5-dihydroxynaphthalene.

4. A method of stabilizing lard subject to oxidative deterioration which comprises adding thereto from about 0.01% to about 0.5% by weight of 2,6-diisobutenyl-1,5-dihydroxynaphthalene.

5. Lard subject to oxidative deterioration containing from about 0.001% to about 0.5% by weight of 2,6-diisobutenyl-1,5-dihydroxynaphthalene.

6. Gasoline subject to oxidative deterioration containing from about 0.001% to about 0.5% by weight of 2,6-diisobutenyl-1,5-dihydroxynaphthalene.

References Cited in the file of this patent

UNITED STATES PATENTS

| Number | Name | Date |
| --- | --- | --- |
| 1,945,521 | Downing et al. | Feb. 6, 1934 |
| 2,031,069 | Richardson | Feb. 18, 1936 |
| 2,031,930 | Buc | Feb. 25, 1936 |
| 2,067,950 | Schneider | Jan. 19, 1937 |
| 2,116,220 | Shoemaker | May 3, 1938 |
| 2,228,667 | Martin | Jan. 14, 1941 |
| 2,296,363 | Messer | Sept. 22, 1942 |
| 2,459,835 | Monroe | Jan. 25, 1949 |